United States Patent
Hara (10) Patent No.: US 9,022,572 B2
(45) Date of Patent: May 5, 2015

(54) PROJECTION APPARATUS, COMPUTER READABLE STORAGE MEDIUM AND CONTROL METHOD OF PROJECTION APPARATUS

(71) Applicant: Casio Computer Co., Ltd., Shibuya-ku, Tokyo (JP)

(72) Inventor: Atsushi Hara, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 266 days.

(21) Appl. No.: 13/797,175

(22) Filed: Mar. 12, 2013

(65) Prior Publication Data
US 2013/0242266 A1    Sep. 19, 2013

(30) Foreign Application Priority Data
Mar. 19, 2012 (JP) .................. 2012-061894

(51) Int. Cl.
G03B 33/12 (2006.01)
G03B 21/00 (2006.01)
(Continued)

(52) U.S. Cl.
CPC .......... *G03B 21/2053* (2013.01); *G03B 21/206* (2013.01); *G03B 21/2013* (2013.01); *G03B 33/12* (2013.01); *H04N 9/3197* (2013.01); *G09G 3/3413* (2013.01); *G03B 21/204* (2013.01); *G03B 33/08* (2013.01); *H04N 9/3111* (2013.01); *H04N 9/3158* (2013.01); *H04N 9/3161* (2013.01); *H04N 9/3164* (2013.01)

(58) Field of Classification Search
CPC ............... G03B 21/206; G03B 21/204; G03B 21/2053; G03B 21/2013; G03B 33/12; H04N 9/3161; H04N 9/3197; H04N 9/3164; H04N 9/3111; H04N 31/58; G09G 3/3413

USPC .......... 353/31, 121; 382/317; 348/760, 227.1; 250/208.2
See application file for complete search history.

(56) References Cited

U.S. PATENT DOCUMENTS

2011/0043764 A1* 2/2011 Narikawa .................. 353/31
2011/0242497 A1* 10/2011 Fukano ...................... 353/31

FOREIGN PATENT DOCUMENTS

CN       101995749 A    3/2011
JP       2004-341105 A   12/2004
(Continued)

OTHER PUBLICATIONS

Chinese Office Action dated Oct. 29, 2014, issued in counterpart Chinese Application No. 201310087184.5.

*Primary Examiner* — Toan Ton
*Assistant Examiner* — Magda Cruz
(74) *Attorney, Agent, or Firm* — Holtz, Holtz, Goodman & Chick PC (57) ABSTRACT

A projection apparatus includes a time-sharing light emitting device, a display device, a projection optical system, an illuminance sensor and a lighting determination unit. The time-sharing light emitting device successively emits color lights one by one. The display device modulates the color lights to form an image. The projection optical system projects the image. The illuminance sensor converts illuminance of the color lights into an electric signal which is an output of the illuminance sensor. The lighting determination unit compares the output with a first threshold value, and operates the time-sharing light emitting device in response to the output being more than the first threshold value, and stops the time-sharing light emitting device in response to the output being equal to or less than the first threshold value.

19 Claims, 7 Drawing Sheets

(51) Int. Cl.
*G06K 9/20* (2006.01)
*H04N 9/31* (2006.01)
*H04N 9/73* (2006.01)
*G01J 1/42* (2006.01)
*G03B 21/20* (2006.01)
*G09G 3/34* (2006.01)
*G03B 33/08* (2006.01)

(56) References Cited

FOREIGN PATENT DOCUMENTS

JP    2009103802 A    5/2009
JP    2011-128641 A    6/2011

* cited by examiner

FIG.7

PROJECTION APPARATUS, COMPUTER READABLE STORAGE MEDIUM AND CONTROL METHOD OF PROJECTION APPARATUS

CROSS REFERENCE TO RELATED APPLICATION

This application is based upon and claims the benefit of priority under 35 USC 119 of Japanese Patent Application No. 2012-061894 filed on Mar. 19, 2012, the entire disclosure of which, including the description, claims, drawings, and abstract, is incorporated herein by reference in its entirety.

BACKGROUND OF THE INVENTION

1. Field of the Invention

The present invention relates to a projection apparatus, a computer readable storage medium and a control method of the projection apparatus.

2. Description of the Related Art

A projection apparatus disclosed in, for example, Japanese Patent Application Laid-Open Publication No. 2004-341105 or Japanese Patent Application Laid-Open Publication No. 2011-128641, irradiates a reflection type display device, such as a digital micromirror device, or a transmission type display device, such as a liquid crystal shutter array panel, with a red light, a green light and a blue light, which are repeatedly and successively emitted by a time-sharing light emitting device, by using lenses and the like, so as to project images formed by the display device onto a screen by using projection lenses.

Incidentally, optical components such as lenses built in a projection apparatus are very precisely designed. Hence, if the projection apparatus receives some impact or the like, or a user disassembles and then reassembles the projection apparatus, positions and/or optical axes of the optical components may change. If light emitted by a time-sharing light emitting device does not pass through its designed path, projected images may become dark or blur. Worse, images may not be projected. It is undesirable for the time-sharing light emitting device to be supplied with power so as to operate, and emit light in such a state, namely, a state in which abnormality is generated.

BRIEF SUMMARY OF THE INVENTION

According to an aspect of the present invention, there is provided a projection apparatus including: a time-sharing light emitting device which repeatedly and successively emits a plurality of color lights; a display device which modulates the color lights to form an image; a projection optical system which projects the image formed by the display device; an illuminance sensor which converts illuminance of the color lights into an electric signal which is an output of the illuminance sensor; and a lighting determination unit which (1) compares the output of the illuminance sensor with a first threshold value, (2) operates the time-sharing light emitting device in response to the output of the illuminance sensor being more than the first threshold value, and (3) stops the time-sharing light emitting device in response to the output of the illuminance sensor being equal to or less than the first threshold value.

Advantages of the invention will be set forth in the description which follows, and in part will be obvious from the description, or may be learned by practice of the invention.

Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute apart of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be explained with reference to the drawings.

In the following, embodiments to realize the present invention are described by using the drawings. Although various limitations which are technically preferable to realize the present invention are given to the following embodiments, the scope of the present invention is not limited to the embodiments or the drawings.

First Embodiment

Figure 1:
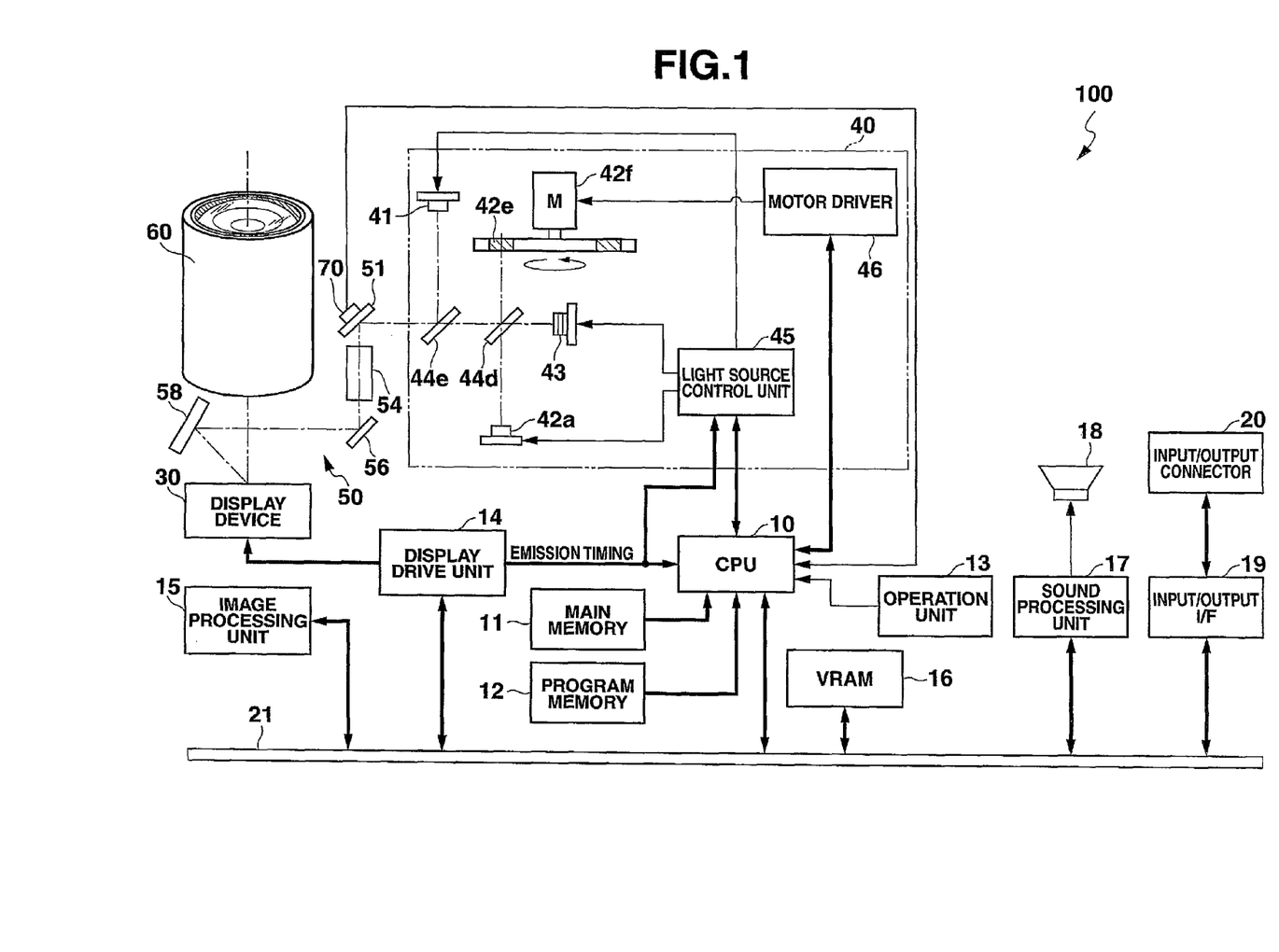
FIG. 1 is a block diagram showing a projection apparatus in accordance with a first embodiment of the present invention.

FIG. 1 is a block diagram schematically showing a projection apparatus 100.

As shown in FIG. 1, the projection apparatus 100 includes a CPU 10, a main memory 11, a program memory 12, an operation unit 13, a display drive unit 14, an image processing unit 15, a video memory 16, a sound processing unit 17, a speaker 18, an input/output interface 19, an input/output connector 20, a system bus 21, a display device 30, a time-sharing light emitting device 40, a light source side optical system 50, a projection optical system 60 and an illuminance sensor 70.

The sound processing unit 17 includes a sound source circuit such as a PCM (Pulse Code Modulation) sound source. The sound processing unit 17 drives the speaker 18 on the basis of sound signals inputted from a sound input terminal of the input/output connector 20 or the like. The sound processing unit 17 makes the speaker produce peeps or the like on the basis of signals transferred from the CPU 10 as a computer via the system bus 21.

The operation unit 13 includes a key operation unit disposed in a main body of the projection apparatus 100 and a laser light reception unit which receives infrared light from a remote controller existing some distance away from the main body of the projection apparatus 100. The operation unit 13 outputs key operation signals based on keys which a user operates with the key operation unit of the main body of the projection apparatus 100 or the remote controller to the CPU 10. Each of the key operation unit and the remote controller is provided with a key to turn on/off power.

The input/output connector 20 includes a pin jack (RCA) video input terminal, a D-sub 15 RGB input terminal, an HDMI (High-Definition Multimedia Interface) image/sound input terminal, a USB (Universal Serial Bus) connector and a sound input/output terminal.

Image signals in accordance with various standards inputted to the input/output connector 20 are transferred to the image processing unit 15 via the input/output interface 19 and the system bus 21.

The image processing unit 15 converts the image signals inputted to the input/output connector 20 into image signals in a predetermined format. The image processing unit 15 stores the converted image signals in the video memory 16 as needed, and then transfers the image signals to the display drive unit 14.

Figure 2:
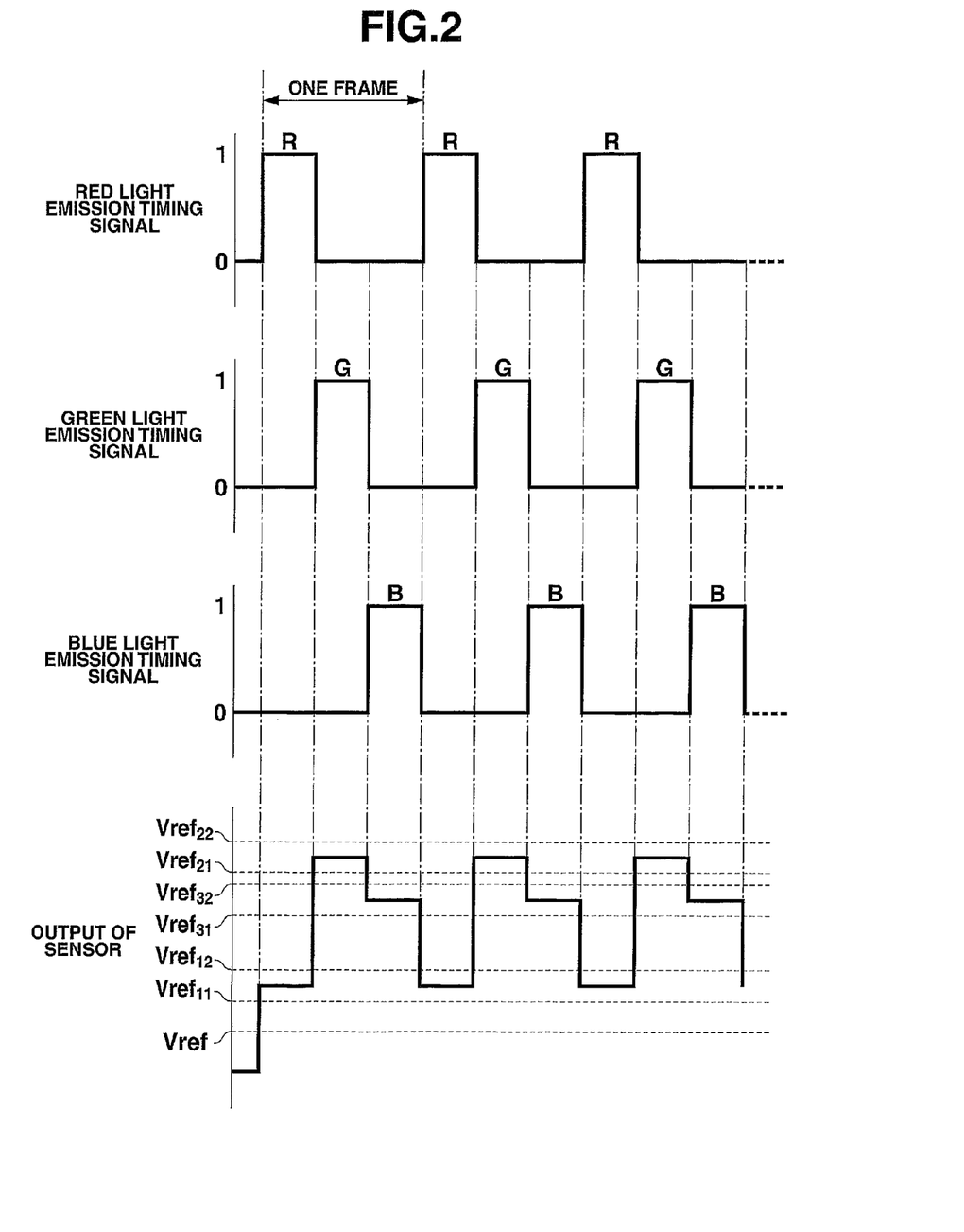
FIG. 2 is a timing chart showing outputs of a timing generator and an illuminance sensor of the projection apparatus.

The display drive unit 14 includes a timing generator (timing generation unit). The timing generator of the display drive unit 14 outputs one-bit red light emission timing signals which control an emission timing for a red light, one-bit green light emission timing signals which control an emission timing for a green light, and one-bit blue light emission timing signals which control an emission timing for a blue light to a light source control unit 45 and the CPU 10 depending on the image signals transferred to the display drive unit 14. More specifically, as shown in FIG. 2, the timing generator of the display drive unit 14 makes the red light emission timing signals, the green light emission signals and the blue light emission signals 1 (high level) successively and repeatedly. The red light timing signals being 1 is the emission timing (irradiation timing) for the red light. The green light timing signals being 1 is the emission timing (irradiation timing) for the green light. The blue light timing signals being 1 is the emission timing (irradiation timing) for the blue light.

As shown in FIG. 1, the time-sharing light emitting device 40 repeatedly and successively emits a plurality of color lights, namely, the red light, the green light and the blue light, in response to the image signals inputted from the display drive unit 14 in a time-sharing manner. That is, as shown in FIG. 2, when the red light emission timing signals are 1, the time-sharing light emitting device 40 emits the red light; when the green light emission timing signals are 1, the time-sharing light emitting device 40 emits the green light; and when the blue light emission timing signals are 1, the time-sharing light emitting device 40 emits the blue light. In FIG. 2, the time-sharing light emitting device 40 emits each of the red light, the green light and the blue light one time during a period of one frame. However, the time-sharing light emitting device 40 may emit at least one of the red light, the green light and the blue light a multiple times during a period of one frame.

As shown in FIG. 1, the light source side optical system 50 projects the red light, the green light and the blue light emitted from the time-sharing light emitting device 40 onto the display device 30.

The display device 30 is a spatial light modulator, and modulates the red light, the green light and the blue light, with which the light source side optical system 50 irradiates the display device 30, in pixels (in spatial light modulation devices) so as to form an image. More specifically, the display device 30 is a digital micromirror device (DMD) including a plurality of movable micromirrors arranged in a two-dimensional array. The movable micromirrors correspond to the spatial light modulation devices as pixels.

The display device 30 does not need to be a reflection type spatial light modulator, and hence may be a transmission type spatial light modulator (for example, a liquid crystal shutter array panel, namely, the so-called liquid crystal display).

The display device 30 is driven by the display drive unit 14. The display drive unit 14 drives the display device 30 in the time-sharing manner at higher speed by multiplying a frame rate by the number of divided color components further by the number of gradations to be displayed in response to the image signals and in accordance with the predetermined format of the image signals. More specifically, while the display device 30 is irradiated with the red light, the display drive unit 14 controls (PWM control, for example) each movable micromirror of the display device 30 in accordance with image data. Consequently, a time ratio (duty ratio) of the red light being reflected toward a projection optical system 60 (described below) is controlled with respect to each movable micromirror. Consequently, a red image is formed by the display device 30. The same applies to the case where the display device 30 is irradiated with the green light or the blue light.

Figure 3:
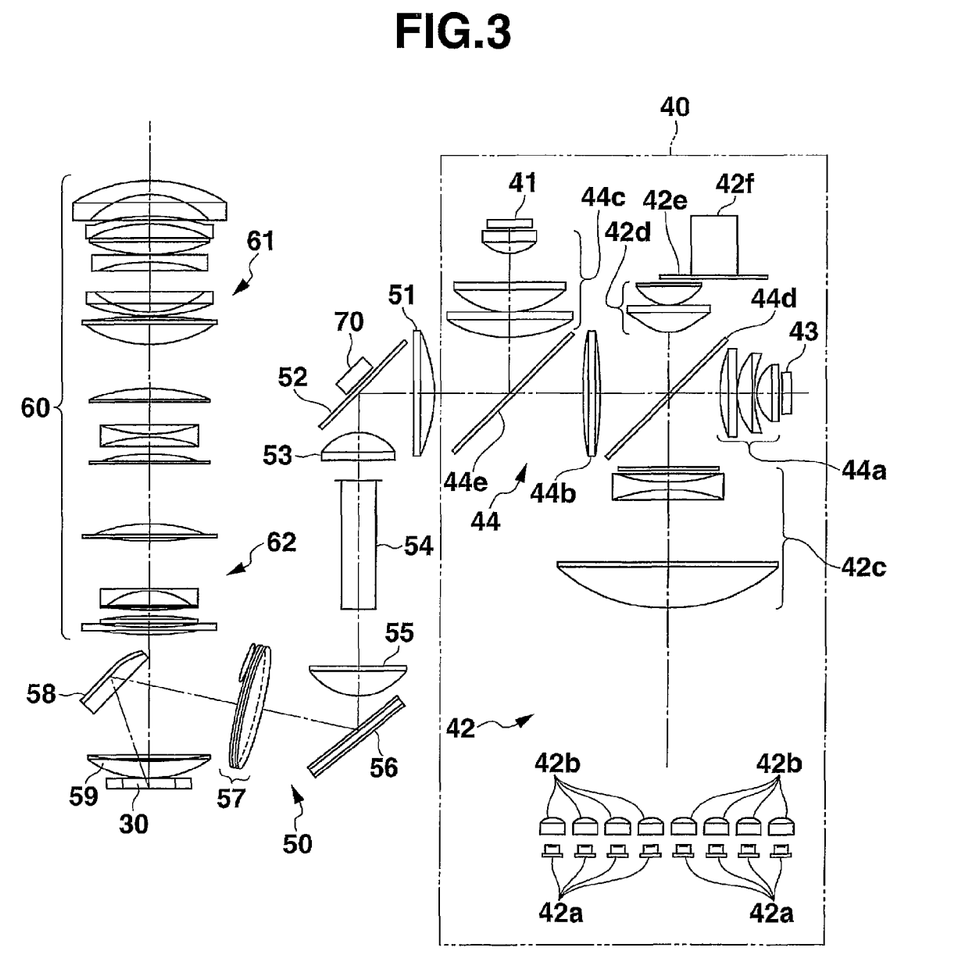
FIG. 3 is a plan view showing an optical unit of the projection apparatus.

With reference to FIGS. 1 and 3, the time-sharing light emitting device 40, the light source side optical system 50 and the projection optical system 60 are described in detail. FIG. 3 is a plan view showing an optical unit of the projection apparatus 100.

The time-sharing light emitting device 40 includes a first light source 41, a second light source 42, a third light source 43, an optical system 44, a light source control unit 45 and a motor driver 46.

The second light source 42 emits the green light. More specifically, the second light source 42 emits excitation light, and also converts the excitation light into the green light. The second light source 42 includes a plurality of excitation light sources 42a, a plurality of collimator lenses 42b, a lens set 42c, a lens set 42d, a fluorescent wheel 42e and a spindle motor 42f.

The excitation light sources 42a are disposed in a two-dimensional array. The excitation light sources 42a are laser diodes which emit excitation laser light. A wavelength band of the excitation laser light emitted from the excitation light sources 42a is a band of a blue light or a band of ultraviolet light, but not limited thereto.

The collimator lenses 42b are disposed in such a way as to face the excitation light sources 42a, respectively, and the collimator lenses 42b collimate the excitation laser light emitted from the excitation light sources 42a. The lens set 42c and the lens set 42d are disposed on the same optical axis. The lens set 42c and the lens set 42d gather beams of the excitation laser light collimated by the collimator lenses 42b into one so as to condense the light.

The fluorescent wheel 42e is disposed in such a way as to face a side where the excitation light sources 42a are disposed in a two-dimensional array. The lens set 42c and the lens set 42d are disposed between the fluorescent wheel 42e and the excitation light sources 42a. The optical axis of the lens set 42c and the lens set 42d is at right angles to the fluorescent wheel 42e. The fluorescent wheel 42e is irradiated with the excitation laser light condensed by the lens set 42c and the lens set 42d. The fluorescent wheel 42e is constituted of green phosphor or the like, which emits a green light by being excited by excitation laser light, and converts the excitation laser light into the green light. The fluorescent wheel 42e is connected to the spindle motor 42f so that the fluorescent wheel 42e is rotated by the spindle motor 42f.

The first light source 41 is a light-emitting diode, which emits a red light. The first light source 41 is disposed in such a way that the optical axis thereof is parallel to the optical axis of the lens sets 42c and 42d.

The third light source 43 is a light-emitting diode, which emits a blue light. The third light source 43 is disposed in such a way that the optical axis thereof is at right angles to the optical axis of the lens sets 42c and 42d and the optical axis of the first light source 41.

The optical system 44 superposes the optical axis of the red light emitted from the first light source 41, the optical axis of the green light emitted from the second light source 42 and the optical axis of the blue light emitted from the third light source 43 on top of each other so as to make the optical axes one optical axis, and emits these red light, green light and blue light. The optical system 44 includes a lens set 44a, a lens 44b, a lens set 44c, a first dichroic mirror 44d and a second dichroic mirror 44e.

The lens set 44a faces the third light source 43. The lens set 44a and the lens 44b are disposed in such a way that their optical axes form a line so as to have the same optical axis. The lens set 44a and the lens 44b are also disposed in such a way that their optical axes (the same optical axis) are at right angles to the optical axis of the lens set 42c and the lens set 42d between the lens set 42c and the lens set 42d.

The first dichroic mirror 44d is disposed between the lens set 44a and the lens 44b. The first dichroic mirror 44d is also disposed between the lens set 42c and the lens set 42d. The first dichroic mirror 44d intersects with the optical axis of the lens sets 42c and 42d at 45 degrees. The first dichroic mirror 44d also intersects with the optical axis of the lens set 44a and the lens 44b at 45 degrees. The first dichroic mirror 44d transmits the excitation light having a wavelength band (a wavelength band of a blue light, for example) emitted from the excitation light sources 42a to the fluorescent wheel 42e. The first dichroic mirror 44d also transmits the light having a wavelength band of a blue light emitted from the third light source 43 to the second dichroic mirror 44e. The first dichroic mirror 44d also reflects the light having a wavelength band of a green light emitted from the fluorescent wheel 42e to the second dichroic mirror 44e.

The lens set 44c faces the first light source 41. The lens set 44c is disposed in such a way that the optical axis thereof is at right angles to the optical axis of the lens set 44a and the lens 44b on a side of the lens 44b, the side being opposite to a side where the third light source 43 and the first dichroic mirror 44d are disposed.

The second dichroic mirror 44e is disposed on a side of the lens set 44c, the side being opposite to a side where the first light source 41 is disposed. The second dichroic mirror 44e is also disposed on a side of the lens 44b, the side being opposite to a side where the first dichroic mirror 44d is disposed. The second dichroic mirror 44e intersects with the optical axis of the lens set 44c at 45 degrees. The second dichroic mirror 44e also intersects with the optical axis of the lens set 44a and the lens 44b at 45 degrees. The second dichroic mirror 44e transmits the light having wavelength bands of a blue light and a green light from the first dichroic mirror 44d to the light source side optical system 50. The second dichroic mirror 44e also reflects the light having a wavelength band of a red light emitted from the first light source 41 to the light source side optical system 50.

The light source side optical system 50 includes a lens 51, a total reflection mirror 52, a lens 53, a light guiding device 54, a lens 55, an optical axis change mirror 56, a condensing lens set 57, an irradiation mirror 58 and an irradiation lens 59.

The lens 51 is disposed on a side of the second dichroic mirror 44e, the side being opposite to a side where the lens 44b is disposed. The lens 51 is also disposed in such a way that the optical axis thereof is superposed on the optical axis of the lens 44b and the lens set 44a so as to have the same optical axis.

The lens 53, the light guiding device 54 and the lens 55 are disposed in such a way that their optical axes form a line so as to have the same optical axis. The optical axis of the lens 53, the light guiding device 54 and the lens 55 is at right angles to the optical axis of the lens 51, the lens 44b and the lens set 44a.

The total reflection mirror 52 is disposed at a point where the optical axis of the lens 53 and the optical axis of the lens 51 intersect. The total reflection mirror 52 intersects with the optical axis of the lens 51, the lens 44b and the lens set 44a at 45 degrees. The total reflection mirror 52 also intersects with the optical axis of the lens 53, the light guiding device 54 and the lens 55 at 45 degrees. The red light, the green light and the blue light emitted by the time-sharing light emitting device 40 are reflected by the total reflection mirror 52 to the light guiding device 54 while being condensed by the lens 53 and the lens 51.

The light guiding device 54 is a light tunnel or a light rod. The light guiding device 54 reflects multiple times or totally reflects at once, the red light, the green light and the blue light emitted from the time-sharing light emitting device 40 with the lateral face of the light guiding device 54 so as to make the red light, the green light and the blue light beams having uniform light intensity distribution. The lens 55 projects the red light, the green light and the blue light guided by the light guiding device 54 onto the optical axis change mirror 56, and also condenses the red light, the green light and the blue light. The optical axis change mirror 56 reflects the red light, the green light and the blue light projected by the lens 55 to the condensing lens set 57. The condensing lens set 57 projects the red light, the green light and the blue light reflected by the optical axis change mirror 56 onto the irradiation mirror 58, and also condenses the red light, the green light and the blue light. The irradiation mirror 58 reflects the red light, the green light and the blue light projected by the condensing lens set 57 onto the display device 30. The irradiation lens 59 projects the red light, the green light and the blue light reflected by the irradiation mirror 58 onto the display device 30. In a case where the display device 30 is a transmission type spatial light modulator, an optical design of the light source side optical system 50 is changed in such a way that the optical axes of the red light, the green light and the blue light, which are projected by the light source side optical system 50, are superposed on the optical axis of the projection optical system 60 described below. Then, the display device 30 is disposed between the projection optical system 60 and the light source side optical system 50.

The projection optical system 60 is disposed in such a way as to face the display device 30. The optical axis of the projection optical system 60 extends forward and backward, and intersects with the display device 30 (at right angles, to be specific). The projection optical system 60 projects the red light, the green light and the blue light reflected by the display device 30 forward so as to project an image formed by the display device 30 onto a screen. The projection optical system 60 includes a movable lens set 61 and a fixed lens set 62. The projection optical system 60 can change the focal length and also perform focusing by the movement of the movable lens set 61.

As shown in FIG. 1, the motor driver 46 of the time-sharing light emitting device 40 drives the spindle motor 42f in response to commands from the CPU 10.

The light source control unit 45 of the time-sharing light emitting device 40 makes the first light source 41, the second light source 42 (the excitation light sources 42a) and the second light source 43 blink so as to control blinking periods and turn-on timings and turn-off timings of the first light source 41, the second light source 42 (the excitation light sources 42a) and the third light source 43 on the basis of the signals outputted by the display drive unit 14. More specifically, as shown in FIG. 2, the light source control unit 45 turns on the first light source 41 when the red light emission timing signals are 1, and turns off the first light source 41 when the red light emission timing signals are 0 (low level). Further, the light source control unit 45 turns on the second light source 42 (the excitation light sources 42a) when the green light emission timing signals are 1, and turns off the second light source 42 (the excitation light sources 42a) when the green light emission timing signals are 0. Further, the light source control unit 45 turns on the third light source 43 when the blue light emission timing signals are 1, and turns off the third light source 43 when the blue light emission timing signals are 0. Consequently, the first light source 41, the second light source 42 (the excitation light sources 42a) and the third light source 43 repeatedly and successively emit the red light, the green light and the blue light.

The light source control unit 45 controls a light emission intensity of the first light source 41 to be a predetermined intensity by performing constant current control or the like. The same applies to the second light source 42 (excitation light sources 42a) and the third light source 43. Among the red light, the green light and the blue light emitted from the time-sharing light emitting device 40, the red light has the lowest illuminance, and the green light has the highest illuminance. (See "Output of Sensor" in FIG. 2.)

With reference to FIGS. 1 to 3, the illuminance sensor 70, the CPU 10, the main memory 11 and the program memory 12 are described.

The illuminance sensor 70 is disposed in the light source side optical system 50. More specifically, the illuminance sensor 70 is disposed on a face of the total reflection mirror 52, the face being opposite to a reflection face thereof. The illuminance sensor 70 converts the illuminance of the red light, the green light and the blue light emitted from the time-sharing light emitting device 40 into electric signals so as to output illuminance signals, which represent the illuminance, to the CPU 10. As long as the illuminance sensor 70 can detect the illuminance of the red light, the green light and the blue light emitted from the time-sharing light emitting device 40, the position where the illuminance sensor 70 is disposed is not limited to the total reflection mirror 52. However, it is preferable that the illuminance sensor 70 be disposed at a position where the red light, the green light and the blue light emitted from the time-sharing light emitting device 40 do not enter the illuminance sensor 70 as direct light, but leak light or indirect light of the red light, the green light and the blue light enters the illuminance sensor 70.

The CPU 10 as a computer controls all the operations of the main memory 11, the program memory 12, the video memory 16, the sound processing unit 17, the input/output interface 19, the light source control unit 45 and the motor driver 46.

The main memory 11 is used as a working memory for the CPU 10, so that the CPU 10 accesses the main memory 11, and various data used for arithmetic processing performed by the CPU 10 are written/read into/from the main memory 11.

The program memory 12 is a readable storage medium for the CPU 10. The program memory 12 stores a program and data readable by the CPU 10. The program stored in the program memory 12 allows the CPU 10 to have various functions, and the CPU 10 performs various types of processing in accordance with the program. A program similar to the program stored in the program memory 12 may be stored in an external storage medium (a semiconductor storage medium, a magnetic storage medium or the like) in advance, and the CPU 10 may perform various types of processing in accordance with the program stored in the external storage medium. Furthermore, the program stored in the external storage medium may be written into the program memory 12 by the CPU 10, and the CPU 10 may perform various types of processing in accordance with the program written into the program memory 12.

Next, flow of the processing performed by the CPU 10 in accordance with the program stored in the program memory 12 or an external storage medium is described with reference to a flowchart shown in FIG. 4. The processing shown in FIG. 4 starts when power of the projection apparatus 100 is off, so that the time-sharing light emitting device 40 and the like are not in operation, although standby power is supplied to the projection apparatus 100.

First, the CPU 10 functions as an error lighting determination unit by the program (Step S1). More specifically, before the CPU 10 turns on (closed state) an electric circuit of the light source control unit 45 of the time-sharing light emitting device 40, the CPU 10 determines whether or not output of the illuminance sensor 70 is 0 (Step S1).

When determining that the output of the illuminance sensor 70 is not 0 (Step S1; NO), the CPU 10 turns off (open state) the electric circuit of the light source control unit 45 (Step S2). Hence, at Step S2, if any of the first light source 41, the second light source 42 (excitation light sources 42a) and the third light source 43 of the time-sharing light emitting device 40 is on (i.e. lighting), the light source (or light sources) is tuned off. Note that the output of the illuminance sensor 70 being not 0 at this point of time, namely, before the CPU 10 turns on the electric circuit of the light source control unit 45, means that there is something wrong in the projection apparatus 100. As described above, in the embodiment, when the CPU 10 determines that the output of the illuminance sensor 70 is not 0, but the time-sharing light emitting device 40 is on, the CPU 10 turns off the time-sharing light emitting device 40. Alternatively, when the CPU 10 determines that the output of the illuminance sensor 70 is not 0, the CPU 10 may compulsorily cut off the electric circuit of the light source control unit 45, so that even if various signals are inputted from the operation unit 13 or the like, the electric circuit of the light source control unit 45 maintains the off state.

When determining that the output of the illuminance sensor 70 is 0 (Step S1; YES), the CPU 10 functions as a power-on determination unit by the program (Step S3). More specifically, the CPU 10 waits a preset period of time, and determines whether or not a power-on key of the key operation unit of the operation unit 13 or the remote controller is operated.

When a user does not operate the power-on key of the key operation unit or the remote controller during the preset period of time, the CPU 10 returns to Step S1 (Step S3; NO). On the other hand, when a user operates the power-on key of the key operation unit or the remote controller during the preset period of time, the CPU 10 turns on the electric circuit of the light source control unit 45, and also starts the display drive unit 14, the image processing unit 15, the video memory 16, the sound processing unit 17 and the input/output interface 19 (Step S4). Consequently, the display drive unit 14 drives the display device 30 in response to the image signals transferred from the image processing unit 15. In addition, the display drive unit 14 outputs the emission timing signals to the light source control unit 45 so that the light source control unit 45 allows the first light source 41, the second light source 42 (excitation light sources 42a) and the third light source 43 to repeatedly and successively emit the red light, the green light and the blue light. Furthermore, the spindle motor 42f is driven by the motor driver 46 to rotate.

While the time-sharing light emitting device 40 successively emits the red light, the green light and the blue light in the time-sharing manner, the output of the illuminance sensor 70 is inputted to the CPU 10. At the time, the CPU 10 functions as a comparator by the program (Step S5). More specifically, the CPU 10 compares the illuminance detected by the illuminance sensor 70 with a predetermined threshold value Vref (first threshold value). As shown in FIG. 2, the predetermined threshold value Vref is set to be less than the lowest illuminance among the illuminance of the red light, the illuminance of the green light and the illuminance of the blue light emitted by the time-sharing light emitting device 40, but to be more than 0. The function of the CPU 10 as a comparator corresponds to a lighting determination unit.

When determining that the illuminance detected by the illuminance sensor 70 is more than the predetermined threshold value Vref while the red light, the green light and the blue light are successively emitted in the time-sharing manner (Step S5; YES), the CPU 10 maintains the on state of the electric circuit of the light source control unit 45 (Step S6). Hence, the time-sharing light emitting device 40 continues to operate and the time-sharing light emitting device 40 continues to successively emit the red light, the green light and the blue light. Then, the CPU 10 returns to Step S5.

On the other hand, when determining that the illuminance detected by the illuminance sensor 70 is equal to or less than the predetermined threshold value Vref while the red light, the green light and the blue light are successively emitted in the time-sharing manner (Step S5; NO), the CPU 10 stops the time-sharing light emitting device 40 (Step S7). That is, the CPU 10 turns off the electric circuit of the light source control unit 45 so as to turn off the first light source 41, the second light source 42 (excitation light sources 42a) and the third light source 43. After that, the CPU 10 maintains the off state of the electric circuit of the light source control unit 45, and maintains the off state of the electric circuit of the light source control unit 45 even if various signals are inputted from the operation unit 13 or the like.

In the embodiment, the illuminance detected by the illuminance sensor 70 is kept being compared with the predetermined threshold value Vref while the red light, the green light and the blue light are successively emitted in the time-sharing manner. However, the illuminance detected by the illuminance sensor 70 may be compared with the predetermined threshold value Vref at timings at which the red light is emitted, at timings at which the green light is emitted, and at timings at which the blue light is emitted.

According to the embodiment of the present invention, the following effects (1) to (4) are obtained.

(1) If a user disassembles and then reassembles the projection apparatus 100, or the projection apparatus 100 receives some impact, positions of the components of the time-sharing light emitting device 40 and/or the light source side optical system 50 change, and accordingly the illuminance of the red light, the green light and the blue light entering the illuminance sensor 70 decreases. In such a case, the output of the illuminance sensor 70 becomes low, and accordingly becomes equal to or less than the threshold value Vref. Consequently, the time-sharing light emitting device 40 is stopped, so that the red light, the green light and the blue light are not projected onto a screen. (See Step S5; NO and Step S7.) Accordingly, a user stops disassembling the projection apparatus 100, and also a user can be informed about necessity of repair or the like.

(2) If, for some reason, power is supplied to the time-sharing light emitting device 40, and the time-sharing light emitting device 40 emits light although power of the projection apparatus 100 is not turned on, the time-sharing light emitting device 40 is immediately stopped. (See Step S1; YES and Step S2.) Accordingly, a user can be informed about necessity of repair or the like.

(3) The red light, the green light and the blue light emitted from the first light source 41, the second light source 42 (excitation light sources 42a) and the third light source 43 can be prevented from passing through other than its designed path (shown in FIG. 3).

(4) The illuminance of the red light, the green light and the blue light is detected by one illuminance sensor 70. Accordingly, the number of components can be reduced.

Second Embodiment

Figure 5:
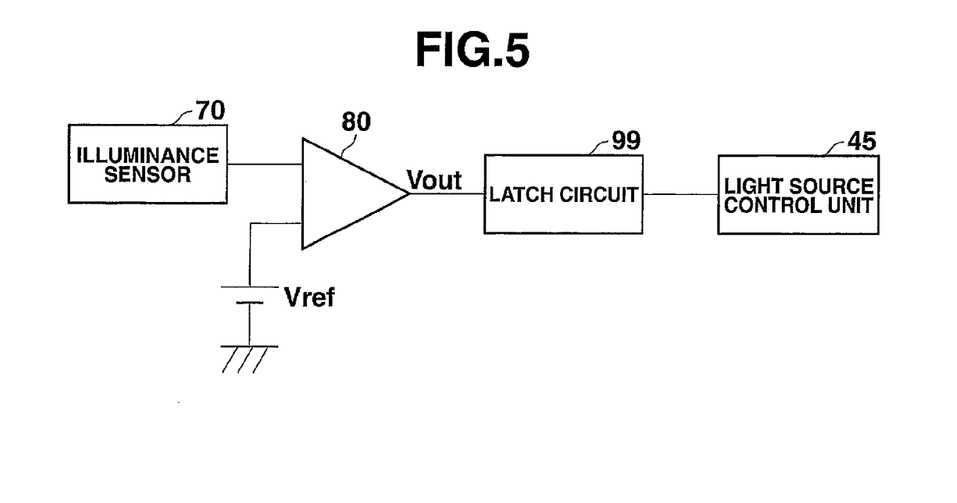
FIG. 5 is a logic circuit diagram showing a circuit of a projection apparatus in accordance with a second embodiment of the present invention.

In the first embodiment, the CPU 10 functions as a comparator by the program. Alternatively, as shown in FIG. 5, a comparator circuit 80 as a comparator may compare the output of the illuminance sensor 70 with the predetermined threshold value Vref. An output terminal of the comparator circuit 80 is connected to an input terminal of a latch circuit 99, and an output terminal of the latch circuit 99 is connected to the light source control unit 45. When the output of the illuminance sensor 70 is more than the predetermined threshold value Vref, output Vout of the comparator circuit 80 is 1, and output of the latch circuit 99 is 1, so that the electric circuit of the light source control unit 45 is turned on. Consequently, the time-sharing light emitting device 40 is operated, and successively emits the red light, the green light and the blue light. On the other hand, when the output of the illuminance sensor 70 is equal to or less than the predetermined threshold value Vref, the output Vout of the comparator circuit 80 is 0, and the output of the latch circuit 99 is 0, so that the electric circuit of the light source control unit 45 is turned off. Consequently, the time-sharing light emitting device 40 is stopped, and does not emit the red light, the green light or the blue light. Once the output Vout of the comparator circuit 80 becomes 0, the latch circuit 99 maintains its output at 0 until a reset signal is inputted. Consequently, even if the output Vout of the comparator circuit 80 becomes 1 after becoming 0, the output of the latch circuit 99 is 0.

In the second embodiment as well, if a user modifies or disassembles and then reassembles the projection apparatus 100, the excitation light sources 42a can be prevented from emitting the light.

Alternatively, the output Vout of the comparator circuit 80 may be inputted to the CPU 10 without the latch circuit 99. Once the output Vout of the comparator circuit 80 becomes 1, the CPU 10 maintains the on state of the electric circuit of the light source control unit 45 until the output Vout of the comparator circuit 80 becomes 0. The CPU 10 maintains the off state of the electric circuit of the light source control unit 45 once the output Vout of the comparator circuit 80 becomes 0 even if the output Vout thereof becomes 1 again thereafter.

The second embodiment of the present invention can obtain the same effects as those obtained by the first embodiment.

Third Embodiment

Difference between the third embodiment and the first embodiment is the program stored in the program memory 12 and the function of the CPU 10 based on the program. With reference to a flowchart shown in FIG. 6, flow of the processing performed by the CPU 10 in accordance with the program stored in the program memory 12 is described. The processing shown in FIG. 6 starts when power of the projection apparatus 100 is off, so that the time-sharing light emitting device 40 and the like are not in operation, although standby power is supplied to the projection apparatus 100.

Figure 6:
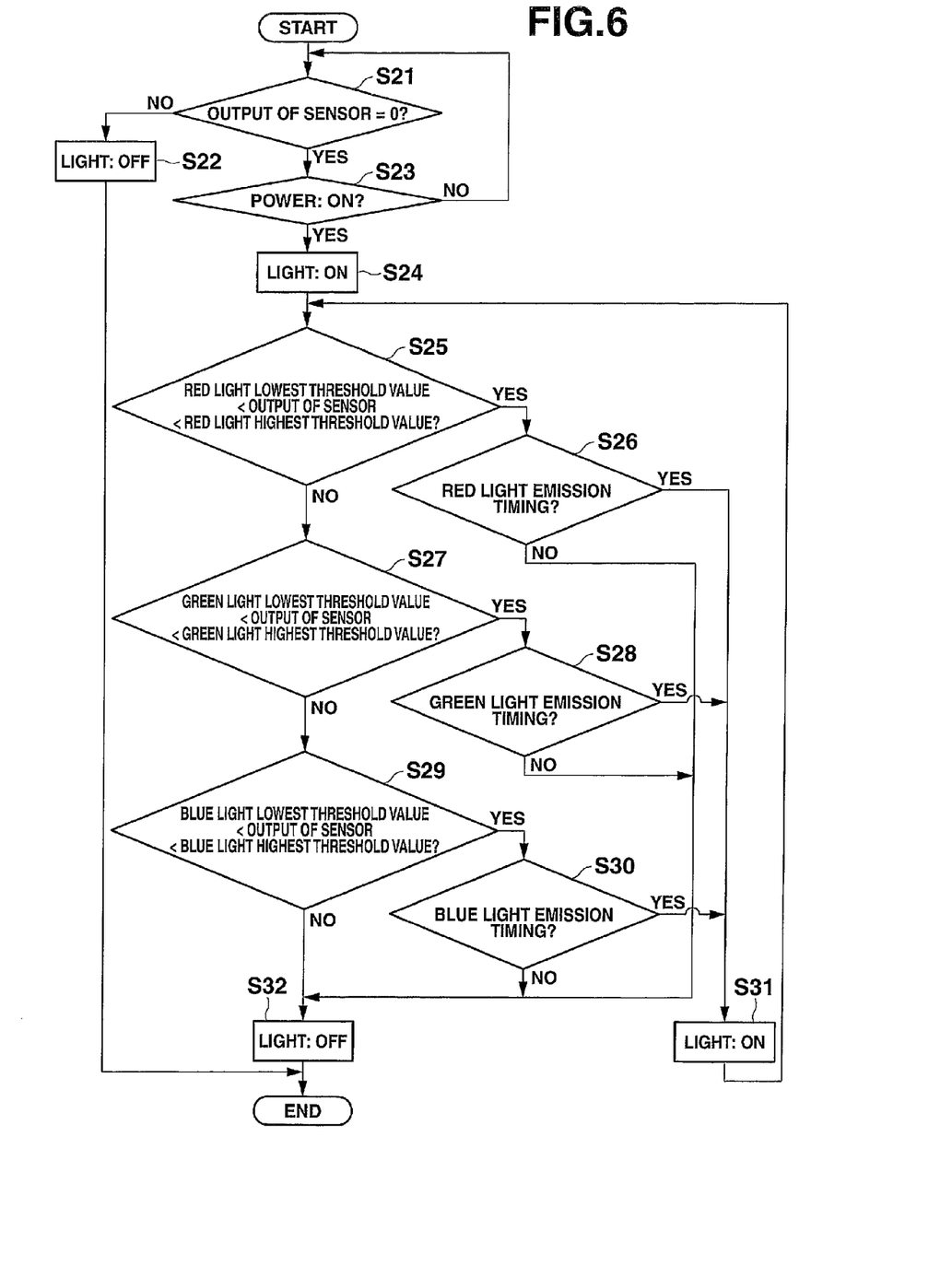
FIG. 6 is a flowchart showing flow of processing performed by a CPU of a projection apparatus in accordance with a third embodiment of the present invention.

First, before the CPU 10 turns on the electric circuit of the light source control unit 45 of the time-sharing light emitting device 40, the CPU 10 determines whether or not the output of the illuminance sensor 70 is 0 (Step S21). When determining that the output of the illuminance sensor 70 is not 0 (Step S21; NO), the CPU 10 turns off the electric circuit of the light source control unit 45 (Step S22). Hence, at Step S22, if any of the first light source 41, the second light source 42 (excitation light sources 42*a*) and the third light source 43 of the time-sharing light emitting device 40 is on, the light source (or light sources) is tuned off. Note that the output of the illuminance sensor 70 being not 0 at this point of time, namely, before the CPU 10 turns on the electric circuit of the light source control unit 45, means that there is something wrong in the projection apparatus 100. As described above, in the embodiment, when the CPU 10 determines that the output of the illuminance sensor 70 is not 0, but the time-sharing light emitting device 40 is on, the CPU 10 turns off the time-sharing light emitting device 40. Alternatively, when the CPU 10 determines that the output of the illuminance sensor 70 is not 0, the CPU 10 may compulsorily cut off the electric circuit of the light source control unit 45, so that even if various signals are inputted from the operation unit 13 or the like, the electric circuit of the light source control unit 45 maintains the off state.

When determining that the output of the illuminance sensor 70 is 0 (Step S21; YES), the CPU 10 waits a preset period of time, and determines whether or not the power-on key of the key operation unit of the operation unit 13 or the remote controller is operated (Step S23). When a user does not operate the power-on key of the key operation unit or the remote controller during the preset period of time, the CPU 10 returns to Step S21 (Step S23; NO). On the other hand, when a user operates the power-on key of the key operation unit or the remote controller during the preset period of time, the CPU 10 turns on the electric circuit of the light source control unit 45, and also starts the display drive unit 14, the image processing unit 15, the video memory 16, the sound processing unit 17 and the input/output interface 19 (Step S24). Consequently, the time-sharing light emitting device 40 is operated, and repeatedly and successively emits the red light, the green light and the blue light. Furthermore, the display drive unit 14 is operated, and outputs the red light emission timing signals, the green light emission timing signals and the blue light emission timing signals as shown in FIG. 2 to the CPU 10.

While the time-sharing light emitting device 40 successively emits the red light, the green light and the blue light in the time-sharing manner, the CPU 10 functions as the lighting determination unit by the program (Steps S25 to S30). The CPU 10 functioning as the lighting determination unit compares, at the emission timing for each of the red light, the green light and the blue light, the illuminance detected by the illuminance sensor 70 with a predetermined lowest threshold value (first threshold value) and a predetermined highest threshold value (second threshold value) set for each of the red light, the green light and the blue light (Steps S25 to S30). In the following, Steps S25 to S30 are described in detail.

While the time-sharing light emitting device 40 successively emits the red light, the green light and the blue light in turn by time-sharing, the CPU 10 functions as a first range determination unit (Step S25), a second range determination unit (Step S27) and a third range determination unit (Step S29) by the program. That is, the CPU 10 compares the illuminance detected by the illuminance sensor 70 with a predetermined red light lowest threshold value Vref11 and a predetermined red light highest threshold value Vref12 (Step S25). In addition, the CPU 10 compares the illuminance detected by the illuminance sensor 70 with a predetermined green light lowest threshold value Vref21 and a predetermined green light highest threshold value Vref22 (Step S27). In addition, the CPU 10 compares the illuminance detected by the illuminance sensor 70 with a predetermined blue light lowest threshold value Vref31 and a predetermined blue light highest threshold value Vref32 (Step S29).

The lowest threshold values Vref11, Vref21 and Vref31 are the first threshold values set for the red light, the green light and the blue light, respectively. The highest threshold values Vref12, Vref22 and Vref32 are the second threshold values set for the red light, the green light and the blue light, respectively. As shown in FIG. 2, the red light lowest threshold value Vref11 is lower than the red light highest threshold value Vref12. The red light lowest threshold value Vref11 is set to be lower than the illuminance of the red light emitted by the time-sharing light emitting device 40, and more than 0. The red light highest threshold value Vref12 is set to be higher than the illuminance of the red light emitted by the time-sharing light emitting device 40, and lower than the illuminance of the blue light emitted by the time-sharing light emitting device 40. The green light lowest threshold value Vref21 is lower than the green light highest threshold value Vref22. The green light lowest threshold value Vref21 is set to be lower than the illuminance of the green light emitted by the time-sharing light emitting device 40, and higher than the illuminance of the blue light emitted by the time-sharing light emitting device 40. The green light highest threshold value Vref22 is set to be higher than the illuminance of the green light emitted by the time-sharing light emitting device 40. The blue light lowest threshold value Vref31 is lower than the blue light highest threshold value Vref32. The blue light lowest threshold value Vref31 is set to be lower than the illuminance of the blue light emitted by the time-sharing light emitting device 40, and higher than the illuminance of the red light emitted by the time-sharing light emitting device 40. The blue light highest threshold value Vref32 is set to be higher than the illuminance of the blue light emitted by the time-sharing light emitting device 40, and lower than the illuminance of the green light emitted by the time-sharing light emitting device 40.

The CPU 10 functions as a red light emission timing determination unit by the program (Step S26). That is, the CPU 10 determines whether or not a timing at which the illuminance detected by the illuminance sensor 70 is more than the red light lowest threshold value Vref11 and less than the red light highest threshold value Vref12 synchronizes with a timing at which the red light emission timing signal outputted from the display drive unit 14 is 1. If the illuminance detected by the illuminance sensor 70 is more than the red light lowest threshold value Vref11 and less than the red light highest threshold value Vref12 (Step S25; YES), and, at the time, the red light emission timing signal outputted from the display drive unit 14 is 1 (Step S26; YES), the CPU 10 maintains the on state of the electric circuit of the light source control unit 45 (Step S31). On the other hand, if the illuminance detected by the illuminance sensor 70 is more than the red light lowest threshold value Vref11 and less than the red light highest threshold value Vref12 (Step S25; YES), and, at the time, the red light emission timing signal outputted from the display drive unit 14 is 0 (Step S26; NO), the CPU 10 turns off the electric circuit of the light source control unit 45 (Step S32).

The CPU 10 functions as a green light emission timing determination unit by the program (Step S28). That is, the CPU 10 determines whether or not a timing at which the illuminance detected by the illuminance sensor 70 is more than the green light lowest threshold value Vref21 and less than the green light highest threshold value Vref22 synchronizes with a timing at which the green light emission timing signal outputted from the display drive unit 14 is 1. If the illuminance detected by the illuminance sensor 70 is more than the green light lowest threshold value Vref21 and less than the green light highest threshold value Vref22 (Step S27; YES), and, at the time, the green light emission timing signal outputted from the display drive unit 14 is 1 (Step S28; YES), the CPU 10 maintains the on state of the electric circuit of the light source control unit 45 (Step S31). On the other hand, if the illuminance detected by the illuminance sensor 70 is more than the green light lowest threshold value Vref21 and less than the green light highest threshold value Vref22 (Step S27; YES), and, at the time, the green light emission timing signal outputted from the display drive unit 14 is 0 (Step S28; NO), the CPU 10 turns off the electric circuit of the light source control unit 45 (Step S32).

The CPU 10 functions as a blue light emission timing determination unit by the program (Step S30). That is, the CPU 10 determines whether or not a timing at which the illuminance detected by the illuminance sensor 70 is more than the blue light lowest threshold value Vref31 and less than the blue light highest threshold value Vref32 synchronizes with a timing at which the blue light emission timing signal outputted from the display drive unit 14 is 1. If the illuminance detected by the illuminance sensor 70 is more than the blue light lowest threshold value Vref31 and less than the blue light highest threshold value Vref32 (Step S29; YES), and, at the time, the blue light emission timing signal outputted from the display drive unit 14 is 1 (Step S30; YES), the CPU 10 maintains the on state of the electric circuit of the light source control unit 45 (Step S31). On the other hand, if the illuminance detected by the illuminance sensor 70 is more than the blue light lowest threshold value Vref31 and less than the blue light highest threshold value Vref32 (Step S29; YES), and, at the time, the blue light emission timing signal outputted from the display drive unit 14 is 0 (Step S30; NO), the CPU 10 turns off the electric circuit of the light source control unit 45 (Step S32).

If the illuminance detected by the illuminance sensor 70 is not within any of ranges, namely, a first range being more than the red light lowest threshold value Vref 11 and less than the red light highest threshold value Vref12, a second range being more than the green light lowest threshold value Vref 21 and less than the green light highest threshold value Vref22, and a third range being more than the blue light lowest threshold value Vref 31 and less than the blue light highest threshold value Vref32 (Step S25; NO, Step S27; NO, Step S29; NO), the CPU 10 turns off the electric circuit of the light source control unit 45 (Step S32). A combination of the first range determination unit (Step S25), the second range determination unit (Step S27), the third range determination unit (Step S29), the red light emission timing determination unit (Step S26), the green light emission timing determination unit (Step S28), and the blue light emission timing determination unit (Step S30) corresponds to the lighting determination unit.

When the electric circuit of the light source control unit 45 is in the off state (Step S32), the time-sharing light emitting device 40 is stopped, so that the first light source 41, the second light source 42 (excitation light sources 42a) and the third light source 43 are turned off. On the other hand, when the electric circuit of the light source control unit 45 is in the on state (Step S31), the time-sharing light emitting device 40 is operated, so that the first light source 41, the second light source 42 (excitation light sources 42a) and the third light source 43 are successively turned on so as to successively emit the red light, the green light and the blue light.

The third embodiment of the present invention can obtain the same effects as those obtained by the first embodiment. In particular, because the highest threshold value and the lowest threshold value are set for each of the red light, the green light and the blue light, accuracy of the determination made to inform a user about necessity of repair or the like increases. In addition, because the illuminance of the red light, the illuminance of the green light and the illuminance of the blue light are monitored at the timings at which the red light, the green light and the blue light are emitted, respectively, the accuracy of the determination made to inform a user about necessity of repair or the like further increases.

Furthermore, the red light, the green light and the blue light emitted from the first light source 41, the second light source 42 (excitation light sources 42a) and the third light source 43, respectively, can be prevented from passing through other than its designed path.

Fourth Embodiment

Figure 7:
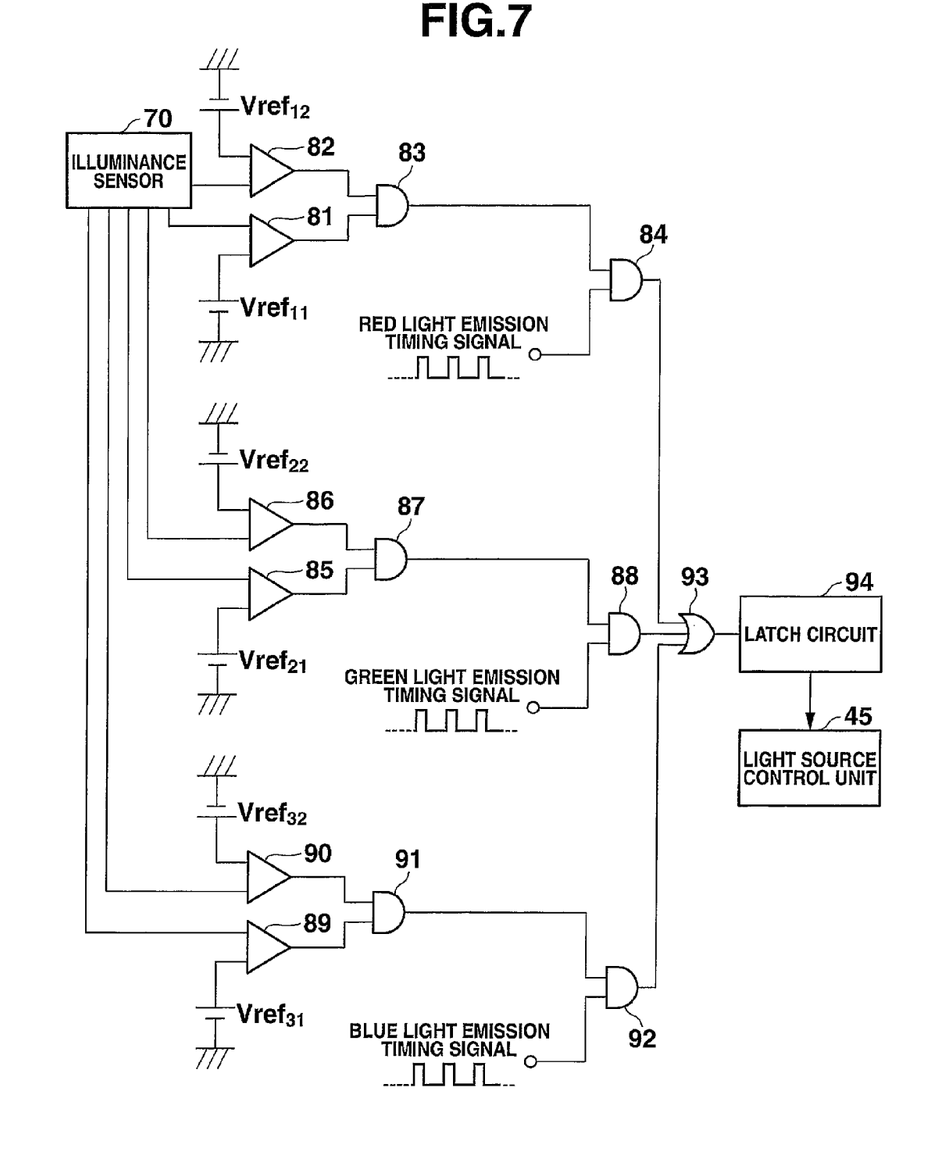
FIG. 7 is a logic circuit diagram showing a circuit of a projection apparatus in accordance with a fourth embodiment of the present invention.

In the third embodiment, the CPU 10 functions as the first range determination unit, which is for the red light, by the program. Alternatively, as shown in FIG. 7, the first range determination unit may be constituted of a comparator circuit 81, a comparator circuit 82 and an AND circuit 83.

The comparator circuit 81 compares the output of the illuminance sensor 70 with the red light lowest threshold value Vref11. The comparator circuit 82 compares the output of the illuminance sensor 70 with the red light highest threshold value Vref12. The AND circuit 81 inputs in itself output of the comparator circuit 81 and output of the comparator circuit 82, and performs AND operation on the outputs. Consequently, if the output of the illuminance sensor 70 is more than the red light lowest threshold value Vref11 and less than the red light highest threshold value Vref12, the output of the AND circuit 83 is 1. If the output of the illuminance sensor 70 is not more than the red light lowest threshold value Vref11 or less than the red light highest threshold value Vref12, the output of the AND circuit 83 is 0.

The second range determination unit, which is for the green light, may be constituted of a comparator circuit 85, a comparator circuit 86 and an AND circuit 87. Consequently, if the output of the illuminance sensor 70 is more than the green light lowest threshold value Vref21 and less than the green light highest threshold value Vref22, the output of the AND circuit 87 is 1. If the output of the illuminance sensor 70 is not more than the green light lowest threshold value Vref21 or less than the green light highest threshold value Vref22, the output of the AND circuit 87 is 0.

The third range determination unit, which is for the blue light, may be constituted of a comparator circuit 89, a comparator circuit 90 and an AND circuit 91. Consequently, if the output of the illuminance sensor 70 is more than the blue light lowest threshold value Vref31 and less than the blue light highest threshold value Vref32, the output of the AND circuit 91 is 1. If the output of the illuminance sensor 70 is not more than the blue light lowest threshold value Vref31 or less than the blue light highest threshold value Vref32, the output of the AND circuit 91 is 0.

With respect to the red light, the output of the AND circuit 83 is inputted to an AND circuit 84, and the red light emission timing signal outputted by the display drive unit 14 is inputted to the AND circuit 84. The AND circuit 84 determines whether or not the timing at which the red light emission timing signal is 1 synchronizes with the timing at which the output of the AND circuit 83 is 1. That is, the AND circuit 84 outputs the AND of the red light emission timing signal outputted by the display drive unit 14 and the output of the AND circuit 83. Consequently, if the output of the AND circuit 83 is 1, and the red light emission timing signal is 1, the output of the AND circuit 84 is 1. If one or both of the output of the AND circuit 83 and the red light emission timing signal is 0, the output of the AND circuit 84 is 0.

With respect to the green light, an AND circuit 88 determines whether or not the timing at which the green light emission timing signal outputted by the display drive unit 14 is 1 synchronizes with the timing at which the output of the AND circuit 87 is 1. With respect to the blue light, an AND circuit 92 determines whether or not the timing at which the blue light emission timing signal outputted by the display drive unit 14 is 1 synchronizes with the timing at which the output of the AND circuit 91 is 1.

The outputs of the AND circuits 84, 88 and 92 are inputted to an OR circuit 93. The OR circuit 93 performs OR operation on the outputs of the AND circuits 84, 88 and 92, and outputs the OR thereof to the light source control unit 45. Consequently, if at least one of the outputs of the AND circuits 84, 88 and 92 is 1, the output of the OR circuit 93 is 1. If all of the outputs of the AND circuits 84, 88 and 92 are 0, the output of the OR circuit 93 is 0. An output terminal of the OR circuit 93 is connected to an input terminal of a latch circuit 94. An output terminal of the latch circuit 94 is connected to the light source control unit 45. If the output of the OR circuit 93 is 1, the output of the latch circuit 94 maintains its output at 1 until the output of the OR circuit 93 becomes 0. If the output of the latch circuit 94 is 1, the electric circuit of the light source control unit 45 is on (in the on state), and the time-sharing light emitting device 40 is operated, and successively emits the red light, the green light and the blue light.

On the other hand, if the output of the OR circuit 93 is 0, the output of the latch circuit 94 is 0. The latch circuit 94 maintains its output at 0 until a reset signal is inputted thereto. Accordingly, if the output of the OR circuit 93 is 0, the electric circuit of the light source control unit 45 is off (in the off state), and the time-sharing light emitting device 40 is stopped, and does not emit the red light, the green light or the blue light. After that, even if the output of the OR circuit 93 becomes 1, the latch circuit 94 maintains the off state of the electric circuit of the light source control unit 45.

The output of the OR circuit 93 may be inputted to the CPU 10 without the latch circuit 94. Once the output of the OR circuit 93 becomes 1, the CPU 10 maintains the on state of the electric circuit of the light source control unit 45 until the output of the OR circuit 93 becomes 0. Once the output of the OR circuit 93 becomes 0, the CPU 10 maintains the off state of the electric circuit of the light source control unit 45 even if the output of the OR circuit 93 becomes 1 again thereafter.

Fifth Embodiment

Difference between the fifth embodiment and the third embodiment is the program stored in the program memory 12 and the function of the CPU 10 based on the program. With reference to a flowchart shown in FIG. 8, flow of the processing performed by the CPU 10 in accordance with the program stored in the program memory 12 is described. The processing shown in FIG. 8 starts when power of the projection apparatus 100 is off, so that the time-sharing light emitting device 40 and the like are not in operation, although standby power is supplied to the projection apparatus 100.

Figure 8:
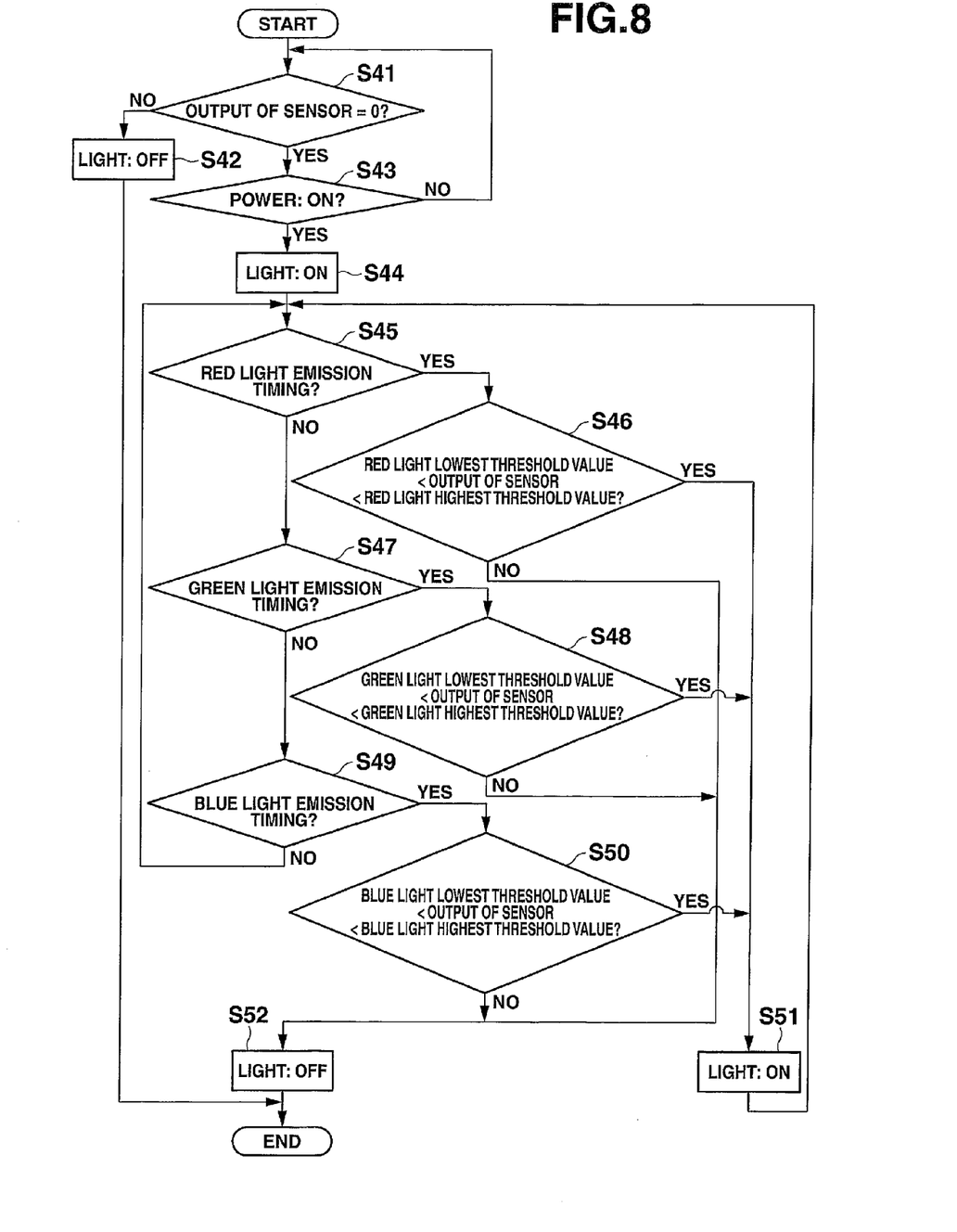
FIG. 8 is a flowchart showing flow of processing performed by a CPU of a projection apparatus in accordance with a fifth embodiment of the present invention.

Steps S41, S42, S43 and S44 taken by the CPU 10 in the fifth embodiment are the same as Steps S21, S22, S23 and S24 taken by the CPU 10 in the third embodiment, respectively.

Next, the CPU 10 functions as the lighting determination unit by the program (Steps S45 to S50). The CPU 10 functioning as the lighting determination unit compares, at the emission timing for each of the red light, the green light and the blue light, the illuminance detected by the illuminance sensor 70 with a predetermined lowest threshold value (first threshold value) and a predetermined highest threshold value (second threshold value) set for each of the red light, the green light and the blue light (Steps S45 to S50).

More specifically, the CPU 10 recognizes the emission timings of the red light, the green light and the blue light on the basis of the red light emission timing signal, the green light emission timing signal and the blue light emission timing signal outputted from the display drive unit 14, respectively (Steps S45, S47 and S49). The function of the CPU 10 at Step S45 corresponds to the red light emission timing determination unit, the function of the CPU 10 at Step S47 corresponds to the green light emission timing determination unit, and the function of the CPU 10 at Step S49 corresponds to the green light emission timing determination unit.

When the red light emission timing signal outputted from the display drive unit 14 is 1 (Step S45; YES), the CPU 10 compares the illuminance detected by the illuminance sensor 70 with the red light lowest threshold value Vref11 and the red light highest threshold value Vref12 at the timing at which the red light emission signal is 1 (Step S46). As a result of the comparison, if the illuminance detected by the illuminance sensor 70 is more than the red light lowest threshold value Vref11 and less than the red light highest threshold value Vref12 (Step S46; YES), the CPU 10 maintains the on state of the electric circuit of the light source control unit 45 (Step S51). On the other hand, as a result of the comparison, if the illuminance detected by the illuminance sensor 70 is not more than the red light lowest threshold value Vref11 or less than the red light highest threshold value Vref12 (Step S46; NO), the CPU 10 turns off the electric circuit of the light source control unit 45 (Step S52). The function of the CPU 10 at Step S46 corresponds to the first range determination unit.

When the green light emission timing signal outputted from the display drive unit 14 is 1 (Step S47; YES), the CPU 10 compares the illuminance detected by the illuminance sensor 70 with the green light lowest threshold value Vref21 and the green light highest threshold value Vref22 at the timing at which the green light emission signal is 1 (Step S48). As a result of the comparison, if the illuminance detected by the illuminance sensor 70 is more than the green light lowest threshold value Vref21 and less than the green light highest threshold value Vref22 (Step S48; YES), the CPU 10 maintains the on state of the electric circuit of the light source control unit 45 (Step S51). On the other hand, as a result of the comparison, if the illuminance detected by the illuminance sensor 70 is not more than the green light lowest threshold value Vref21 or less than the green light highest threshold value Vref22 (Step S48; NO), the CPU 10 turns off the electric circuit of the light source control unit 45 (Step S52). The function of the CPU 10 at Step S48 corresponds to the second range determination unit.

When the blue light emission timing signal outputted from the display drive unit 14 is 1 (Step S49; YES), the CPU 10 compares the illuminance detected by the illuminance sensor 70 with the blue light lowest threshold value Vref31 and the blue light highest threshold value Vref32 at the timing at which the blue light emission signal is 1 (Step S50). As a result of the comparison, if the illuminance detected by the illuminance sensor 70 is more than the blue light lowest threshold value Vref31 and less than the blue light highest threshold value Vref32 (Step S50; YES), the CPU 10 maintains the on state of the electric circuit of the light source control unit 45 (Step S51). On the other hand, as a result of the comparison, if the illuminance detected by the illuminance sensor 70 is not more than the blue light lowest threshold value Vref31 or less than the blue light highest threshold value Vref32 (Step S50; NO), the CPU 10 turns off the electric circuit of the light source control unit 45 (Step S52). The function of the CPU 10 at Step S50 corresponds to the third range determination unit.

When the electric circuit of the light source control unit 45 is in the off state (Step S52), the time-sharing light emitting device 40 is stopped, so that the first light source 41, the second light source 42 (excitation light sources 42*a*) and the third light source 43 are turned off. On the other hand, when the electric circuit of the light source control unit 45 is in the on state (Step S51), the time-sharing light emitting device 40 is operated, so that the first light source 41, the second light source 42 (excitation light sources 42*a*) and the third light source 43 are successively turned on so as to successively emit the red light, the green light and the blue light.

The fifth embodiment of the present invention can obtain the same effects as those obtained by the first embodiment. In particular, because the highest threshold value and the lowest threshold value are set for each of the red light, the green light and the blue light, accuracy of the determination made to inform a user about necessity of repair or the like increases. In addition, because the illuminance of the red light, the illuminance of the green light and the illuminance of the blue light are monitored at the timings at which the red light, the green light and the blue light are emitted, respectively, the accuracy of the determination made to inform a user about necessity of repair or the like further increases.

Furthermore, the red light, the green light and the blue light emitted from the first light source 41, the second light source 42 (excitation light sources 42*a*) and the third light source 43, respectively, can be prevented from passing through other than its designed path.

Furthermore, even if the illuminance (values of the illuminance) of the red light, the green light and the blue light are close to each other, in the fifth embodiment, first, it is determined whether the emission timing is for the red light, the green light or the blue light, and then, the illuminance detected (measured) by the illuminance sensor 70 is compared with the highest threshold value and the lowest threshold value based on the emission timing. Accordingly, for example, when the projection apparatus 100 is operated under its normal condition without any abnormality, if the illuminance of the blue light is within both the first range of threshold values, which is for the red light, and the third range of threshold values, which is for the blue light, the projection apparatus 100 is not stopped by an error made in the determination.

MODIFICATION

In the embodiments, the second light source 42, which emits the green light, includes the excitation light sources 42*a* and the fluorescent wheel 42*e*. Alternatively, a light emitting diode which emits green light may be used as the second light source 42. In this case, as shown in FIG. 3, the green light emitting diode is disposed at a position where the optical axis of the lens set 42*d* intersects with the fluorescent wheel 42*e*, and the green light emitting diode emits the green light to the lens set 42*d*.

The fluorescent wheel 42*e* may have green phosphor and a diffusion/transmission unit, and the fluorescent wheel 42*e* rotates so as to alternately emit the green light and the blue light. In this case, the third light source 43 is removed, and the blue light which passes through the diffusion/transmission unit of the fluorescent wheel 42*e* is guided by an optical system including a reflection mirror and a lens to the position where the third light source 43 is disposed so as to pass through the lens set 44*a* and the first dichroic mirror 44*d* in the order named. The excitation light sources 42*a* emit the light not only when the green light emission timing signal is 1 but also when the blue light emission timing signal is 1.

As long as the time-sharing light emitting device 40 repeatedly and successively emits the red light, the green light and the blue light, the time-sharing light emitting device 40 can take a configuration other than the configurations described above.

The projection apparatus 100 may be applied to a rear projection display apparatus.

Figure 4:
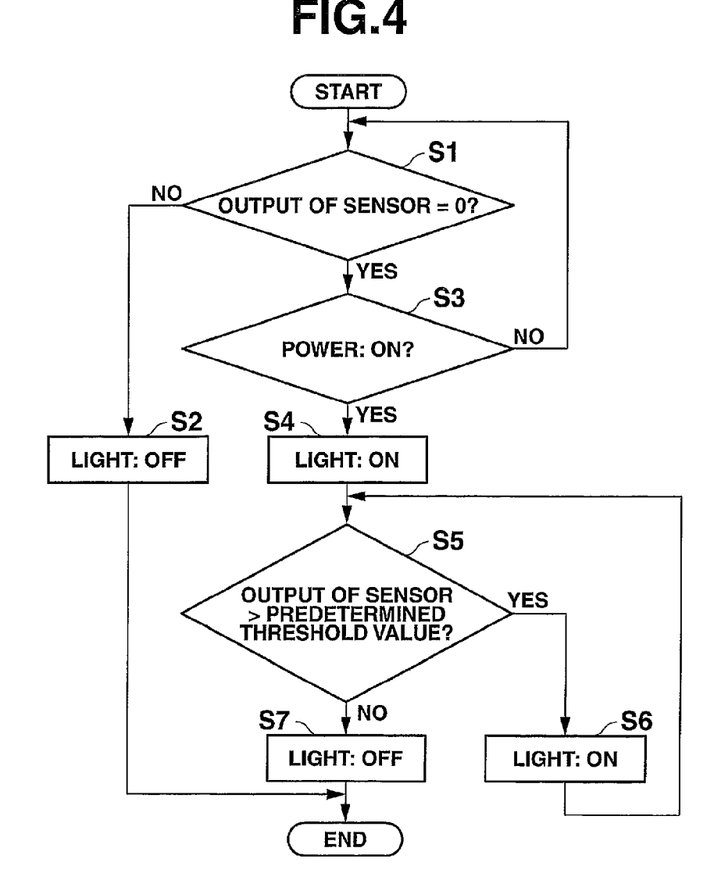
FIG. 4 is a flowchart showing flow of processing performed by a CPU of the projection apparatus.

In the embodiments, before the CPU 10 turns on (closed state) the electric circuit of the light source control unit 45 of the time-sharing light emitting device 40, the CPU 10 determines whether or not the output of the illuminance sensor 70 is 0 (Step S1 in FIG. 4, Step S21 in FIG. 6, Step S41 in FIG. 8). Alternatively, a predetermined period of time not to turn on a light source may be provided after the electric circuit of the light source control unit 45 of the time-sharing light emitting device 40 is turned on, and the CPU 10 may function as the error lighting determination unit during the predetermined period of time. Accordingly, it is unnecessary to operate a sensor while a projection apparatus is on standby, so that standby power can be reduced.

In the embodiments, it is determined whether or not the lighting is performed in a normal way at all the emission timings, namely, the red light emission timings, the green light emission timings and the blue light emission timings. Alternatively, the determination on the lighting may be performed in manner described above at least one of the red light emission timings, the green light emission timings and the blue light emission timings.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A projection apparatus comprising:
   a time-sharing light emitting device which successively emits a plurality of color lights one by one;

a display device which modulates the color lights to form an image;

a projection optical system which projects the image formed by the display device;

an illuminance sensor which converts illuminance of the color lights into an electric signal which is an output of the illuminance sensor; and a lighting determination unit which (1) compares the output of the illuminance sensor with a first threshold value, (2) operates the time-sharing light emitting device in response to the output of the illuminance sensor being more than the first threshold value, and (3) stops the time-sharing light emitting device in response to the output of the illuminance sensor being equal to or less than the first threshold value.

2. The projection apparatus according to claim 1 further comprising a timing generation unit which outputs an emission timing signal to decide an emission timing at which the color lights are emitted, wherein the time-sharing light emitting device successively emits the color lights in response to the emission timing signal, and the lighting determination unit compares the output of the illuminance sensor with the first threshold value at the emission timing.

3. The projection apparatus according to claim 2, wherein the lighting determination unit compares the output of the illuminance sensor with the first threshold value for one of the color lights emitted.

4. The projection apparatus according to claim 2, wherein the lighting determination unit (1) determines whether or not a timing at which the output of the illuminance sensor is more than the first threshold value synchronizes with the emission timing signal, (2) operates the time-sharing light emitting device in response to determination that the timing synchronizes with the emission timing signal, and (3) stops the time-sharing light emitting device in response to determination that the timing does not synchronize with the emission timing signal.

5. The projection apparatus according to claim 1, wherein the lighting determination unit (1) compares the output of the illuminance sensor with the first threshold value and a second threshold value, which is more than the first threshold value, (2) operates the time-sharing light emitting device in response to the output of the illuminance sensor being more than the first threshold value and less than the second threshold value, and (3) stops the time-sharing light emitting device in response to the output of the illuminance sensor being not more than the first threshold value or less than the second threshold value.

6. The projection apparatus according to claim 1 further comprising a timing generation unit which successively outputs emission timing signals to decide emission timings at which the color lights are emitted, respectively, wherein the time-sharing light emitting device successively emits the color lights in response to the respective emission timing signals, the first threshold value is a plurality of first threshold values which correspond to the color lights, respectively, second threshold values correspond to the color lights, respectively, the second threshold values being more than the respective first threshold values, and with respect to each of the color lights, the lighting determination unit (1) compares the output of the illuminance sensor with the first threshold value and the second threshold value at the emission timing based on the emission timing signal, (2) operates the time-sharing light emitting device in response to the output of the illuminance sensor being more than the first threshold value and less than the second threshold value, and (3) stops the time-sharing light emitting device in response to the output of the illuminance sensor being not more than the first threshold value or less than the second threshold value.

7. The projection apparatus according to claim 1 further comprising a timing generation unit which successively outputs emission timing signals to decide emission timings at which the color lights are emitted, respectively, wherein the time-sharing light emitting device successively emits the color lights in response to the respective emission timing signals, the first threshold value is a plurality of first threshold values which correspond to the color lights, respectively, second threshold values corresponds to the color lights, respectively, the second threshold values being more than the respective first threshold values, and with respect to each of the color lights, the lighting determination unit (1) compares the output of the illuminance sensor with the first threshold value and the second threshold value, (2) determines whether or not a timing at which the output of the illuminance sensor is more than the first threshold value and less than the second threshold value synchronizes with the emission timing signal outputted by the timing generation unit, (3) operates the time-sharing light emitting device in response to determination that the timing synchronizes with the emission timing signal, and (4) stops the time-sharing light emitting device in response to determination that the timing does not synchronize with the emission timing signal.

8. The projection apparatus according to claim 1, wherein the time-sharing light emitting device includes a laser diode.

9. The projection apparatus according to claim 1, wherein the lighting determination unit includes a comparator.

10. A computer readable storage medium storing a program to allow a computer of a projection apparatus including: the computer; a time-sharing light emitting device which successively emits a plurality of color lights one by one; a display device which modulates the color lights to form an image; a projection optical system which projects the image formed by the display device; and an illuminance sensor which converts illuminance of the color lights into an electric signal which is an output of the illuminance sensor, to perform:

a lighting determination step of (1) comparing the output of the illuminance sensor with a first threshold value, (2) operating the time-sharing light emitting device in response to the output of the illuminance sensor being more than the first threshold value, and (3) stopping the time-sharing light emitting device in response to the output of the illuminance sensor being equal to or less than the first threshold value.

11. The computer readable storage medium according to claim 10, wherein the projection apparatus further includes a timing generation unit which outputs an emission timing signal to decide an emission timing at which the color lights are emitted, the time-sharing light emitting device successively emits the color lights in response to the emission timing signal, and in the lighting determination step, the output of the illuminance sensor is compared with the first threshold value at the emission timing.

12. The computer readable storage medium according to claim 11, wherein in the lighting determination step, the output of the illuminance sensor is compared with the first threshold value for one of the color lights emitted.

13. The computer readable storage medium according to claim 11, wherein in the lighting determination step, whether or not a timing at which the output of the illuminance sensor is more than the first threshold value synchronizes with the emission timing signal is determined, and the time-sharing light emitting device is operated in response to determination that the timing synchronizes with the emission timing signal, and stopped in response to determination that the timing does not synchronize with the emission timing signal.

14. The computer readable storage medium according to claim 10, wherein in the lighting determination step, the output of the illuminance sensor is compared with the first threshold value and a second threshold value, which is more than the first threshold value, and the time-sharing light emitting device is operated in response to the output of the illuminance sensor being more than the first threshold value and less than the second threshold value, and stopped in response to the output of the illuminance sensor being not more than the first threshold value or less than the second threshold value.

15. A control method of a projection apparatus including: a time-sharing light emitting device which successively emits a plurality of color lights one by one; a display device which modulates the color lights to form an image; a projection optical system which projects the image formed by the display device; and an illuminance sensor which converts illuminance of the color lights into an electric signal which is an output of the illuminance sensor, the control method comprising:

a lighting determination step of (1) comparing the output of the illuminance sensor with a first threshold value, (2) operating the time-sharing light emitting device in response to the output of the illuminance sensor being more than the first threshold value, and (3) stopping the time-sharing light emitting device in response to the output of the illuminance sensor being equal to or less than the first threshold value.

16. The control method according to claim 15, wherein the projection apparatus further includes a timing generation unit which outputs an emission timing signal to decide an emission timing at which the color lights are emitted, the time-sharing light emitting device successively emits the color lights in response to the emission timing signal, and in the lighting determination step, the output of the illuminance sensor is compared with the first threshold value at the emission timing.

17. The control method according to claim 16, wherein in the lighting determination step, the output of the illuminance sensor is compared with the first threshold value for one of the color lights emitted.

18. The control method according to claim 16, wherein in the lighting determination step, whether or not a timing at which the output of the illuminance sensor is more than the first threshold value synchronizes with the emission timing signal is determined, and the time-sharing light emitting device is operated in response to determination that the timing synchronizes with the emission timing signal, and stopped in response to determination that the timing does not synchronize with the emission timing signal.

19. The control method according to claim 15, wherein in the lighting determination step, the output of the illuminance sensor is compared with the first threshold value and a second threshold value, which is more than the first threshold value, and the time-sharing light emitting device is operated in response to the output of the illuminance sensor being more than the first threshold value and less than the second threshold value, and stopped in response to the output of the illuminance sensor being not more than the first threshold value or less than the second threshold value.

* * * * *